(12) United States Patent
Kim

(10) Patent No.: US 6,171,490 B1
(45) Date of Patent: Jan. 9, 2001

(54) WATER PURIFIER WITH A ROTATING MAGNET

(76) Inventor: Kil Ho Kim, #806-305 Mido Apartment 60-4 Banpo-Dong, Seocho-Ku, Seoul (KR)

( * ) Notice: Under 35 U.S.C. 154(b), the term of this patent shall be extended for 0 days.

(21) Appl. No.: 09/258,540

(22) Filed: Feb. 26, 1999

(51) Int. Cl.[7] ................................................. B01D 35/06
(52) U.S. Cl. ......................... 210/223; 210/222; 210/695
(58) Field of Search .................................. 210/222, 223, 210/695, 510.1, 97, 103, 470, 473, 497.3

(56) References Cited

U.S. PATENT DOCUMENTS

| | | |
|---|---|---|
| 4,540,489 | 9/1985 | Barnard . |
| 4,904,381 * | 2/1990 | Urakami ............................ 210/223 |
| 5,059,296 | 10/1991 | Sherman . |
| 5,628,900 | 5/1997 | Naito . |

* cited by examiner

Primary Examiner—W. L. Walker
Assistant Examiner—Marianne S. Ocampo
(74) Attorney, Agent, or Firm—Brij K. Agarwal; Eckert Seamans Cherin & Mellott, LLC; David V. Radack

(57) ABSTRACT

A water purifier capable of magnetizing water and adding ceramic components into the magnetized water. The water is magnetized by a rotating permanent magnet, such that its molecular structure is changed into the hexagonal ring structure, and, the dissolved oxygen content of water is increased by passing through a plurality of micro holes or fine grooves on the inside surface of a ceramic filter. Also, mineral components disposed in the double wall of the ceramic filter are added to the water passing through it. Accordingly, the water may be converted into condition suitable to the human body.

2 Claims, 4 Drawing Sheets

WATER PURIFIER WITH A ROTATING MAGNET

BACKGROUND OF THE INVENTION

The present invention relates to a water purifier, and more particularly to a water purifier capable of magnetizing water and adding ceramic components into the magnetized water.

At the present time, due to increases in living sewage, industrial waste water and the like, the natural purification of rivers and artificial purification of waterworks and sewage system can not supply enough drinkable water to the public. Accordingly, most of them drink spring water or use many kind of domestic water purifiers.

The current water purifiers clarify water by introducing the water to be clarified into the inside of the purifier and them filtering the water several times. The function of changing and supplying water in a natural condition, helpful to the human body has not been sufficiently achieved.

The efficiency of magnetized water is well known in the art. The state of magnetized water however cannot be maintained in the form of water useful to the human body, since, the molecular structure of the water must be changed. If rotating power is applied to the water, the molecular structure of water is changed into a state which is useful to the human body. Preferably, some mineral components are added to it.

However, current water purifiers do not satisfactorily perform the requirements described above. Additionally, some of them have the function of magnetizing the water or adding few mineral components into the water by passing it through a filter cartridge.

SUMMARY OF THE INVENTION

Therefore, in order to address the drawbacks described above, the objective of the present invention is to provide a water purifier capable of adding mineral components into the water to be purified while magnetizing it.

Another objective of the present invention is to provide a water purifier capable of increasing the dissolved oxygen content of the water to be purified as well as changing the molecular structure of water.

In order to achieve the above objectives, in accordance with one aspect of the present invention there is provided a water purifier comprising a main body with an electric motor mounted inside thereof and a vessel seated on a seating portion of the main body. A bar magnet is attached to a shaft of the motor. Sensors are provided to one side wall of the vessel in each different height. A lower end of the vessel is provided with a frustrated cone-shaped ceramic filter. The ceramic filter includes a double wall filled with ceramic particles, in which the double wall has a plurality of micro holes around its inside and outside surface, and an oval magnet is disposed in the internal space of the ceramic filter.

In accordance with another aspect of the present invention there is provided a water purifier comprising a main body with an electric motor mounted inside thereof and a vessel seated on a seating portion of the main body. A bar magnet is attached to a shaft of the motor: sensors are provided to one side wall of the vessel in each different height. A lower end of the vessel is provided with a disk-shaped ceramic filter. The ceramic filter includes a double wall filled with ceramic particles, in which the wall has a plurality of fine vertical grooves around the inside and outside surfaces. A magnet body is disposed in the internal space of the ceramic filter. The lower end of the ceramic filter is provided with an annular guide portion. The bottom of the ceramic filter is engaged with a supporting cap for maintaining a constant interval with the annular guide portion, and the magnetic body comprises a supporting rod integrally formed on a lower end thereof, a supporting plate engaged with an end of the supporting rod, and a rotating ball inserted in the center of a bottom surface of the supporting plate.

BRIEF DESCRIPTION OF THE DRAWINGS

Other objectives and aspects of the invention will become apparent from the following description of the embodiments with reference to the accompanying drawings in which.

DETAILED DESCRIPTION OF THE PREFERRED EMBODIMENTS

Figure 1:
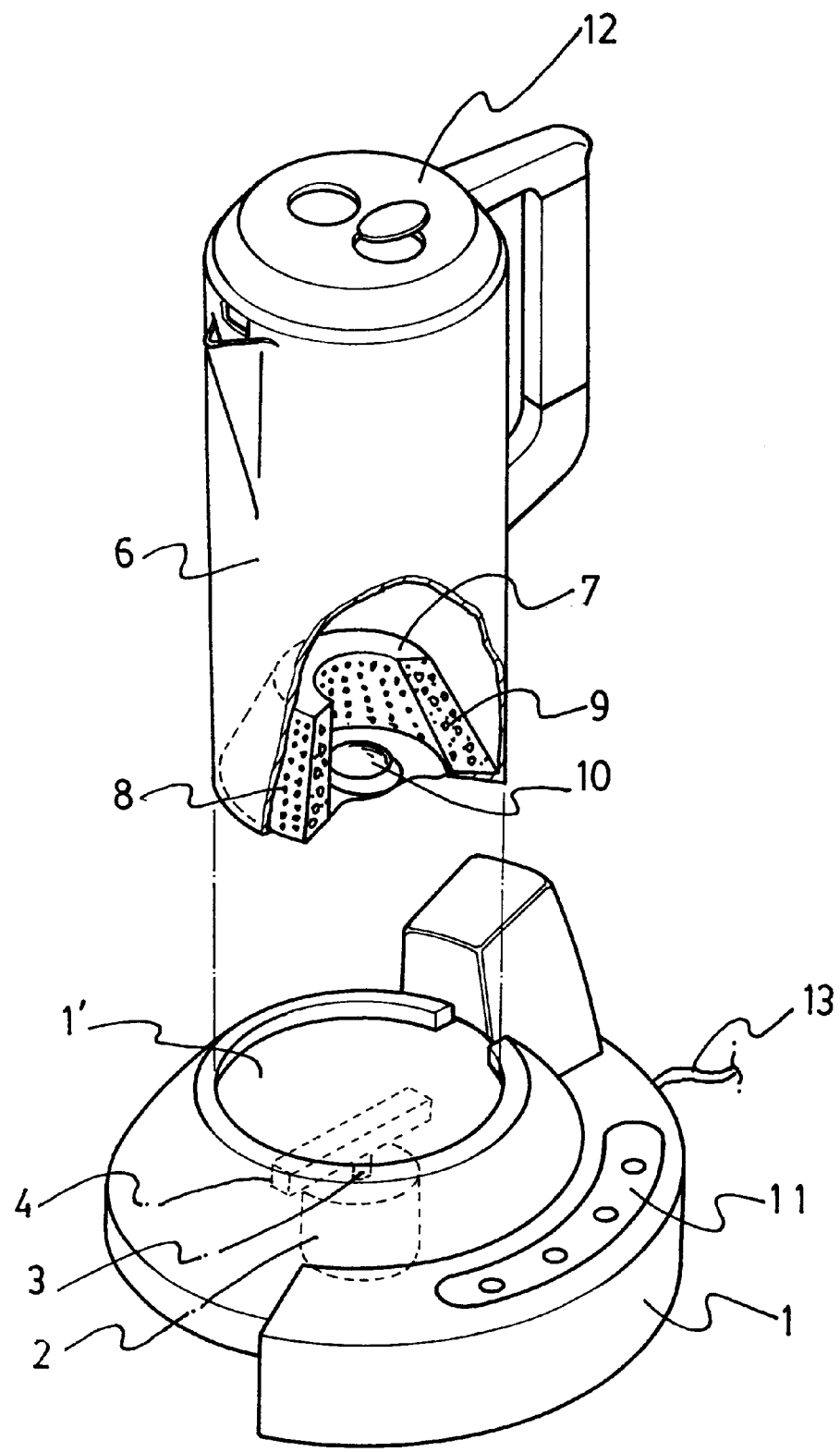
FIG. 1 is a partially cut-away view in perspective of a first preferred embodiment of the present invention.

The water purifier according to a first preferred embodiment of the present invention comprises a main body 1 with an electric motor 2 mounted inside thereof, and a vessel 6 seated on a seating portion 1' of the main body 1. A bar magnet 4 is attached to a shaft 3 of the motor 2.

Sensors 5, 5' and 5" are provided to one side wall of the vessel 6 in each different height. The lower end of the vessel 6 is provided with a frustum cone-shaped ceramic filter 7. The ceramic filter 7 includes a double wall filled with ceramic particles 9, in which the double wall has a plurality of micro holes 8 around its inside and outside surface. Also, an oval magnet 10 is disposed in the internal space of the ceramic filter 7.

According to the present invention, the oval magnet 10 may consist of an alloy of magnet and Ag, and the ceramic filter 7 may consist of an antibiotic resin. Also, the ceramic filter may be made in the shape of a column or trumpet.

Figure 2:
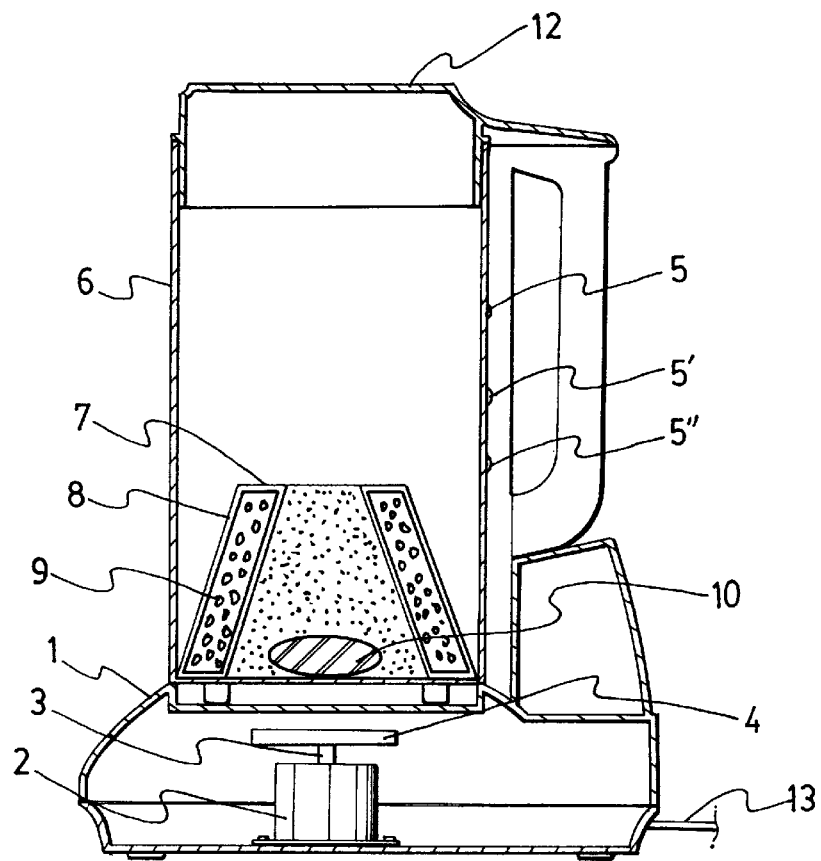
FIG. 2 is a cross sectional view showing the assembled state of FIG. 1.
Figure 3:
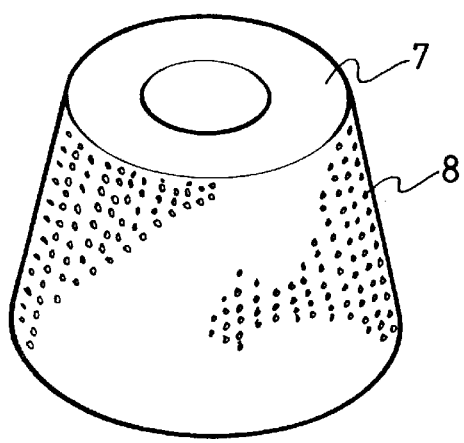
FIG. 3 is a perspective view of the ceramic filter in FIG. 1.
Figure 4:
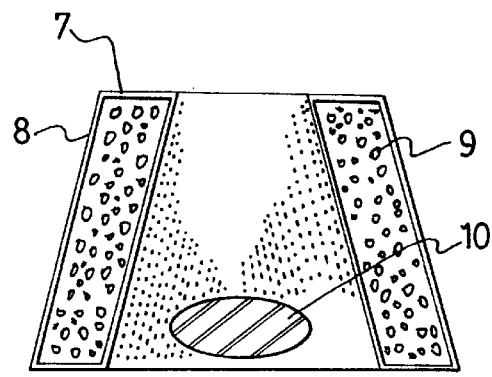
FIG. 4 is a cross sectional view taken along line IV—IV in FIG. 3.
Figure 5:
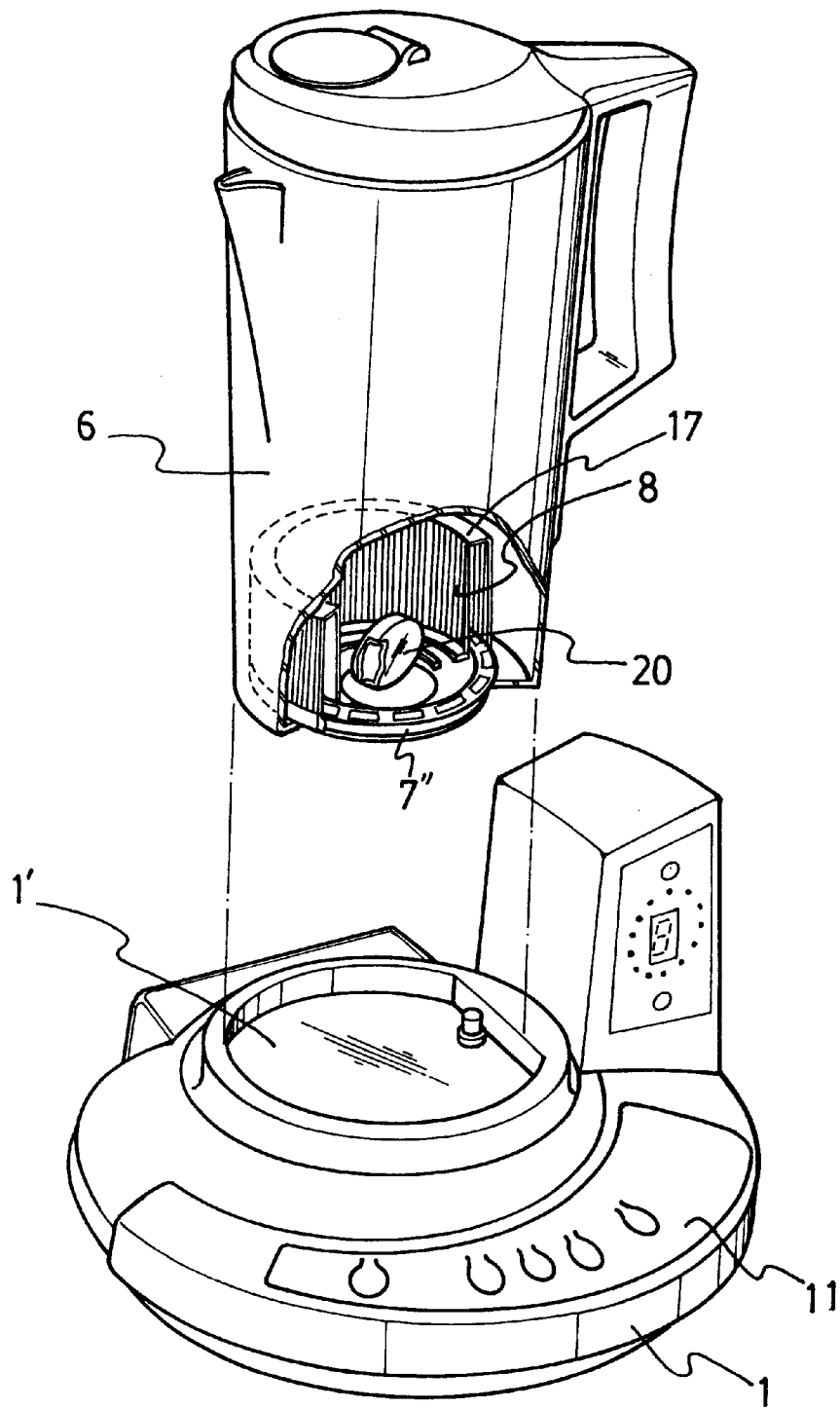
FIG. 5 is a partially cut-away view in perspective of a second preferred embodiment of the present invention.

The operation of the first embodiment of the present invention will now be described with reference to FIG. 2.

After the vessel 6 is seated on the seating portion 1' of the main body 1, the motor 2 operates by engaging an operating switch 11, and in turn, the bar magnet 4 attached to the shaft 3 of the motor rotates. At that time, since a strong rotating force is produced by rotating the magnet with opposite magnetic poles, the magnetic body 10 disposed inside of the vessel 6 is continuously rotated in its position, thereby dispersing the water in the ceramic filter 7 towards the inside surface of the vessel.

At that time, the dispersed water flows into the double wall through the micro holes 8 on the inside surface of the ceramic filter 7, past the ceramic particles 9 by the continuously applied rotating force, and flows out of the micro holes 8 on the outside surface of the ceramic filter 7.

Therefore, the water is magnetized by a rotating permanent magnet, such that its molecular structure is changed into a hexagonal ring structure, and, the dissolved oxygen content of water is increased by passing through the plurality of the micro holes. Also, the mineral components disposed in the double wall are added to the water passing through it. Accordingly, the water may be converted into a condition suitable to the human body.

Referring now to FIGS. 5 to 8 a second preferred embodiment of the present invention will be described, wherein like reference numerals designate like or corresponding parts.

The water purifier according to a second preferred embodiment of the present invention comprises a main body 1 with an electric motor 2 mounted inside thereof, and a vessel 6 seated on a seating portion 1' of the main body 1. A bar magnet 4 is attached to a shaft 3 of the motor 2.

Sensors 5, 5' and 5" are provided to one side wall of the vessel 6 at each different height. The lower end of the vessel 6 is provided with a disk-shaped ceramic filter 17. The ceramic filter 17 includes a double wall filled with ceramic particles 9, in which the wall has a plurality of fine vertical grooves 18 around the inside and outside surfaces. Also, a magnetic body 20 is disposed in the internal space of the ceramic filter 17.

The lower end of the ceramic filter 17 is provided with an annular guide portion 7'. The bottom of the ceramic filter 17 is engaged with a supporting cap 7" for maintaining a constant interval with the annular guide portion 7'.

The magnetic body 20 comprises a supporting rod integrally formed on the lower end thereof, a supporting plate 12 engaged with an end of the supporting rod, and a rotating ball 13 inserted in the center of the bottom surface of the supporting plate 12.

Figure 6:
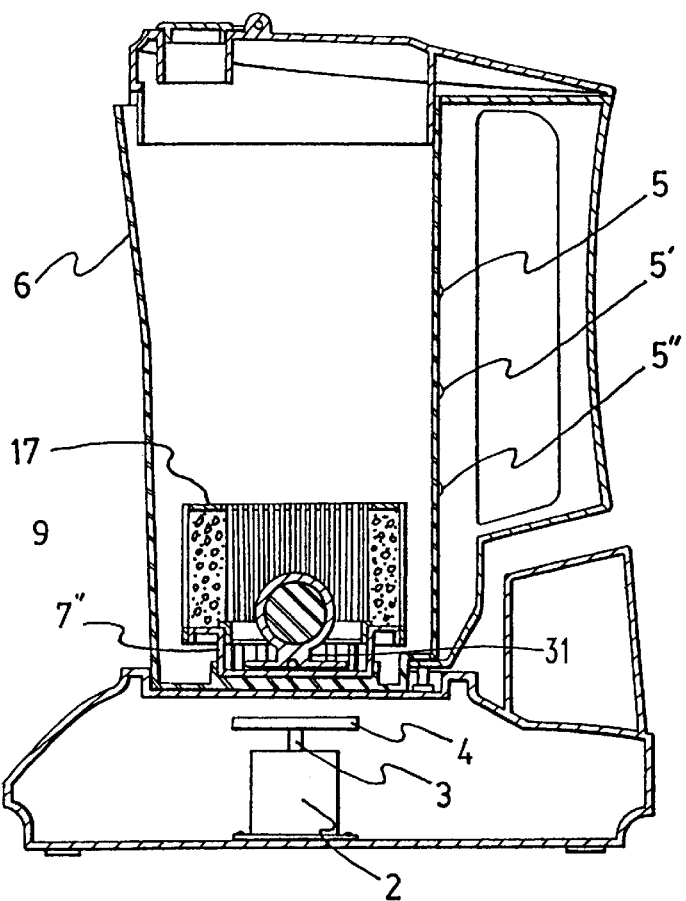
FIG. 6 is a cross sectional view showing the assembled state of FIG. 5.
Figure 7:
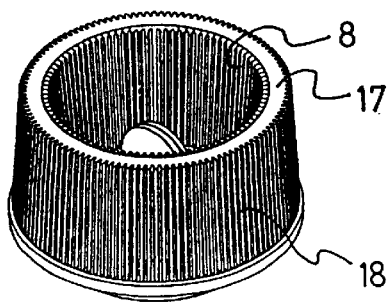
FIG. 7 is a perspective view of the ceramic filter in FIG. 5.
Figure 8:
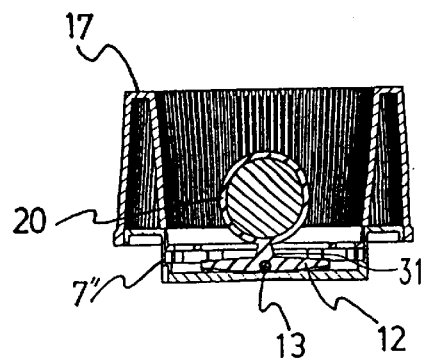
FIG. 8 is a cross sectional view taken along line VIII—VIII in FIG. 7.

The operation of the second embodiment of the present invention will now be described with reference to FIG. 6.

After the vessel 6 is seated on the seating portion 1' of the main body 1, an operating switch 11 is engaged to operate the motor 2, and, in turn, the bar magnet 4 attached to the shaft 3 of the motor rotates. At that time, since a strong rotating force is produced by the rotation of the magnet with opposite magnetic poles, the magnetic body 20 disposed inside of the vessel 6 is rotated in its position.

The magnetic body 20 rotates continuously being supported by the rod. The smooth rotation of the magnetic body 20 is maintained by the rotating ball 13 inserted in the bottom surface of the supporting plate 12, thereby producing a very strong rotating force. And thus, the water within the ceramic filter 17 flows in whirls and is dispersed towards the inside surface of the vessel.

At that time, the dispersed water flows into the double wall through the grooves 18 on the inside surface of the ceramic filter 17, past the ceramic particles 9 by the rotating force applied continuously, and flows out the grooves 8 on the outside surface of the ceramic filter 17.

What is claimed is:

1. A water purifier comprising a main body with an electric motor mounted inside thereof; and a vessel seated on a seating portion of the main body;

wherein a bar magnet is attached to a shaft of the motor, a lower end of the vessel is provided with a frustrum cone-shaped ceramic filter, the ceramic filter includes a double wall filled with ceramic particles, in which the double wall has a plurality of micro holes around its inside and outside surface, and an oval magnet is disposed in the internal space of the ceramic filter.

2. A water purifier comprising a main body with an electric motor mounted inside thereof; and a vessel seated on a seating portion of the main body;

wherein a bar magnet is attached to a shaft of the motor, a lower end of the vessel is provided with a disk-shaped ceramic filter, the ceramic filter includes a double wall filled with ceramic particles, in which the wall has a plurality of fine vertical grooves around the inside and outside surfaces, a magnetic body is disposed in the internal space of the ceramic filter wherein a lower end of the ceramic filter is provided with an annular guide portion, a bottom of the ceramic filter is engaged with a supporting cap for maintaining a constant interval with the annular guide portion; and wherein the magnetic body comprises a supporting rod integrally formed on a lower end thereof, a supporting plate engaged with an end of the supporting rod, and a rotating ball inserted in a center of a bottom surface of the supporting plate.

* * * * *

UNITED STATES PATENT AND TRADEMARK OFFICE
CERTIFICATE OF CORRECTION

PATENT NO. : 6,171,490 B1
DATED : January 9, 2001
INVENTOR(S) : Kil Ho Kim

It is certified that error appears in the above-identified patent and that said Letters Patent is hereby corrected as shown below:

Column 3,
Line 30, after "rod" insert -- 31 --.
Line 32, after "rod" insert -- 31 --.
Line 45, after "rod" insert -- 31 --.

Column 4,
Line 34, after "filter", insert -- ; --.

Signed and Sealed this

Twentieth Day of August, 2002

Attest:

JAMES E. ROGAN
Attesting Officer   Director of the United States Patent and Trademark Office